S. T. ALLEN.
WATER BALLASTED TRACTOR WHEEL.
APPLICATION FILED AUG. 14, 1917.
1,257,778.  Patented Feb. 26, 1918.
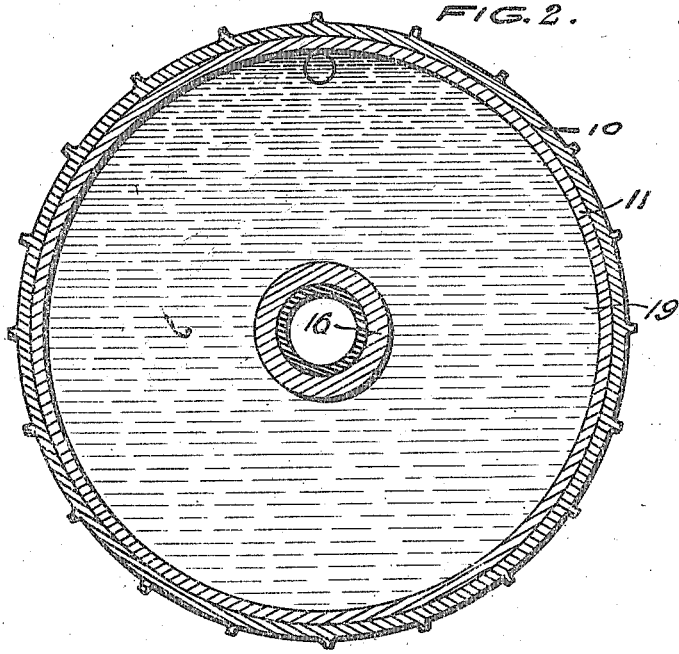
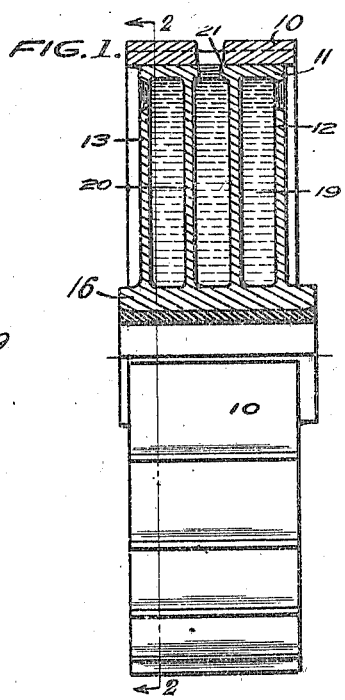
INVENTOR
SHERMAN T ALLEN
BY Hazard & Miller
ATT'YS.

UNITED STATES PATENT OFFICE.

SHERMAN T. ALLEN, OF LOS ANGELES, CALIFORNIA.

WATER-BALLASTED TRACTOR-WHEEL.

1,257,778.

Specification of Letters Patent.

Patented Feb. 26, 1918.

Application filed August 14, 1917. Serial No. 126,220.

*To all whom it may concern:*

Be it known that I, SHERMAN T. ALLEN, a citizen of the United States, residing at Los Angeles, in the county of Los Angeles and State of California, have invented new and useful Improvements in Water-Ballasted Tractor-Wheels, of which the following is a specification.

This invention relates to a tractor wheel.

The principal object of this invention is to provide a tractor wheel which may be varied in weight, as desired, to produce traction for various purposes, thereby forming a tractor to be operated with the least possible running expense and without excessive strains upon the parts unless required.

Figure 1 is a view in section and elevation illustrating a tractor wheel constructed according to my invention.

Fig. 2 is a view in vertical section as seen on the line 2—2 of Fig. 1.

Referring more particularly to the drawings 10 indicates a circular tread of a wheel. This tread may be of any desired design, and is here shown as having cleats across its face. The tread is mounted upon the outer wall 11 of the wheel. As shown, the wall 11 is formed integral with end walls 12 and 13, and concentric to a hub 16 of the wheel.

Circular water ballast compartments 19 are formed between the end walls 12 and 13 by partition walls 20. These walls extend parallel to the end walls and in spaced relation to each other, thus forming a number of parallel disk-like ballast compartments. These compartments may be separately filled by filling openings 21 one of which is formed through the tread of the wheel and the other two through the opposite side walls 12 and 13.

In utilizing the invention, the various compartments are filled with water. In case the tractor upon which the wheels are to be used is to perform light work, the traction required will be slight. The ballast compartments are therefore partly filled. When other work of heavier nature is to be done, additional filling is supplied to the compartments until the wheels have been given a weight sufficient to supply the desired traction. Not only will the use of a plurality of compartments permit various weights to be obtained, but the water will be separated so that it will not surge around within the wheel, as would be the result if a single large compartment were used.

It will thus be seen that the device here disclosed provides simple means for ballasting a tractor wheel and also means whereby the weight of the tractor wheel may be easily regulated in consideration of the work to be accomplished by the tractor.

While I have shown the preferred form of my construction, it will be understood that various changes in the combination, construction and arrangement of parts may be made by those skilled in the art without departing from the spirit of the invention.

I claim:

1. A wheel, comprising an outer rim, solid end walls spaced in relation to each other and formed integral with said rim, a concentric hub formed integral with the end walls and concentric with the rim, and a series of concentric partition walls formed upon the hub to provide individually-filled water ballast compartments.

2. A wheel comprising a hub, end walls extending from the hubs, partition walls extending from the hub between the end walls, and a rim upon the end walls and upon the partition walls and forming inclosed compartments having filling openings.

In testimony whereof I have signed my name to this specification.

SHERMAN T. ALLEN.